US009334775B2

(12) United States Patent
Wu et al.

(10) Patent No.: US 9,334,775 B2
(45) Date of Patent: May 10, 2016

(54) WATER INJECTION EXHAUST TREATMENT SYSTEM

(71) Applicant: Tenneco Automotive Operating Company Inc., Lake Forest, IL (US)

(72) Inventors: Anzhou Wu, Chaohu (CN); Joshua Hicks, Linden, MI (US); Padmanabha Reddy Ettireddy, Canton, MI (US); Daniel R. Johnson, Jackson, MI (US); Ryan A. Floyd, Mason, MI (US); Gaofeng Fan, Shanghai (CN)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 14/389,224

(22) PCT Filed: Aug. 16, 2013

(86) PCT No.: PCT/CN2013/081643
§ 371 (c)(1),
(2) Date: Sep. 29, 2014

(87) PCT Pub. No.: WO2015/021644
PCT Pub. Date: Feb. 19, 2015

(65) Prior Publication Data
US 2015/0204225 A1 Jul. 23, 2015

(51) Int. Cl.
*F01N 3/08* (2006.01)
*B01D 53/92* (2006.01)
*F01N 3/20* (2006.01)

(52) U.S. Cl.
CPC *F01N 3/08* (2013.01); *B01D 53/92* (2013.01); *F01N 3/2066* (2013.01);
(Continued)

(58) Field of Classification Search
CPC ............... F01N 3/208; F01N 2610/02; F01N 2610/085; F01N 2610/1406; F01N 2610/144; F01N 2610/1453; F01N 2610/1473; F01N 2610/1493
USPC ............. 60/274, 286, 295, 301, 318
See application file for complete search history.

(56) References Cited

U.S. PATENT DOCUMENTS 2,867,497 A * 1/1959 Calvert ............... B01D 53/944
422/177
8,250,856 B2 8/2012 Ohashi
(Continued)

FOREIGN PATENT DOCUMENTS

CN 101408122 A 4/2009
CN 202497790 U 10/2012
(Continued)

*Primary Examiner* — Jorge Leon, Jr.
(74) *Attorney, Agent, or Firm* — Harness, Dickey & Pierce, P.L.C.

(57) ABSTRACT

An exhaust treatment system may include gas, reductant and water conduits, a nozzle and a pump. The gas conduit may be in fluid communication with a source of compressed gas and may include a first valve controlling a flow of compressed gas through the gas conduit. The water conduit may be in fluid communication with a water source and may include a second valve controlling a flow of water through the water conduit. The nozzle may be in fluid communication with the gas, reductant and water conduits. The pump may be disposed between the nozzle and the second valve and may be in fluid communication with the reductant and water conduits. The pump may be operable in a first pumping direction to pump reductant from the reductant source to the nozzle and in a second pumping direction to pump reductant away from the nozzle and toward the reductant source.

29 Claims, 2 Drawing Sheets

(52) U.S. Cl.
CPC ........ *F01N 2610/00* (2013.01); *F01N 2610/02* (2013.01); *F01N 2610/14* (2013.01); *F01N 2610/1493* (2013.01); *Y02T 10/24* (2013.01); *Y10T 137/0318* (2015.04); *Y10T 137/85978* (2015.04)

(56) References Cited

U.S. PATENT DOCUMENTS

2011/0126514 A1 6/2011 Brammell
2012/0299205 A1 11/2012 Lee et al.
2013/0101472 A1* 4/2013 Lee .................... F01N 3/2066 422/168
2014/0260199 A1* 9/2014 Grzesiak ................ F01N 3/206 60/274

FOREIGN PATENT DOCUMENTS

| | | |
|---|---|---|
| CN | 202606021 U | 12/2012 |
| EP | 1656986 A1 | 5/2006 |
| JP | 2006-122878 A | 5/2006 |

* cited by examiner

WATER INJECTION EXHAUST TREATMENT SYSTEM

FIELD

The present disclosure relates to an exhaust treatment system having water injection.

BACKGROUND

This section provides background information related to the present disclosure and is not necessarily prior art.

Selective catalytic reduction technology has been used in conjunction with reducing nitrogen oxides present in the exhaust of combustion engines. Many vehicles utilizing combustion engines are equipped with exhaust aftertreatment devices for reducing nitrogen oxide emissions. Some of these systems are constructed using urea-based technology including a container for storing the urea and a delivery system for transmitting the urea from the container to the exhaust stream. While these systems may have performed well in the past, it may be desirable to provide an air-assisted delivery system to more efficiently and effectively deliver the urea (or other reductant) to the exhaust stream. Furthermore, it may be desirable to purge the delivery system with water and/or air to maintain the efficiency and effectiveness of delivery system.

SUMMARY

This section provides a general summary of the disclosure, and is not a comprehensive disclosure of its full scope or all of its features.

In one form, the present disclosure provides an exhaust treatment system that may include a gas supply conduit, a reductant supply conduit, a water supply conduit, a nozzle and a pump. The gas supply conduit may be in fluid communication with a source of compressed gas and may include a first valve controlling a flow of compressed gas through the gas supply conduit. The reductant supply conduit may be in fluid communication with a reductant source. The water supply conduit may be in fluid communication with a water source and may include a second valve controlling a flow of water through the water supply conduit. The nozzle may be in fluid communication with the gas supply conduit, the reductant supply conduit and the water supply conduit. The pump may be disposed between the nozzle and the second valve and may be in fluid communication with the reductant supply conduit and the water supply conduit. The pump may be operable in a first pumping direction to pump reductant from the reductant source to the nozzle and in a second pumping direction to pump reductant away from the nozzle and toward the reductant source.

In some embodiments, the pump may be operable in the first pumping direction to pump water from the water source to the nozzle.

In some embodiments, the pump may be operable in the second pumping direction to pump water away from the nozzle and toward the water source.

In some embodiments, the reductant supply conduit may include a third valve movable between open and closed positions to control a flow of reductant between the reductant source and the pump.

In some embodiments, the exhaust treatment system may include a filter disposed between the pump and the second valve. The filter may be in fluid communication with the reductant supply conduit and the water supply conduit.

In some embodiments, the source of compressed gas may include a source of compressed air. In other embodiments, the source of compressed gas could include additional or alternative gases.

In some embodiments, the gas supply conduit may be in fluid communication with parallel first and second gas flow paths.

In some embodiments, the first gas flow path may include a third valve that is movable between a first position allowing gas flow through the first gas flow path and a second position restricting gas flow through the first gas flow path.

In some embodiments, the first gas flow path may fluidly couple the gas supply conduit with a conduit extending between the pump and a first inlet of the nozzle.

In some embodiments, the second gas flow path may bypass the third valve and couples the gas supply conduit with a second inlet of the nozzle disposed between the first inlet and an outlet of the nozzle.

In some embodiments, the second gas flow path may include a restrictor.

In some embodiments, the reductant supply conduit may include a fourth valve movable between open and closed positions to control a flow of reductant between the reductant source and the pump.

A method of operating the exhaust treatment system may include operating the exhaust treatment system in a first purge mode in which the pump is operating in the second pumping direction, the fourth valve is open and the first, second and third valves are closed; operating the exhaust treatment system in a second purge mode in which the pump stops operating, the second valve is closed and the first, third and fourth valves are open; operating the exhaust treatment system in a third purge mode in which the pump is operating in the first pumping direction, the second valve is open and the first, third and fourth valves are closed; operating the exhaust treatment system in a fourth purge mode in which the pump is operating in the second pumping direction, the second valve is open and the first, third and fourth valves are closed; and operating the exhaust treatment system in a fifth purge mode in which the fourth valve is closed and the first, second and third valves are open.

In some embodiments, the second purge mode may be performed after the first purge mode; the third purge mode may be performed after the second purge mode; the fourth purge mode may be performed after the third purge mode; and the fifth purge mode may be performed after the fourth purge mode.

In another form, the present disclosure provides an exhaust treatment system that may include a gas supply conduit, a reductant supply conduit, a water supply conduit, a nozzle, a pump, and first and second gas flow paths. The gas supply conduit may be in fluid communication with a source of compressed gas and may include a first valve controlling a flow of compressed gas through the gas supply conduit. The reductant supply conduit may be in fluid communication with a reductant source. The water supply conduit may be in fluid communication with a water source and may include a second valve controlling a flow of water through the water supply conduit. The nozzle may be in fluid communication with the gas supply conduit, the reductant supply conduit and the water supply conduit. The pump may be disposed between the nozzle and the second valve and may be in fluid communication with the reductant supply conduit and the water supply conduit. The first and second gas flow paths may extend between and fluidly communicate with the gas supply conduit and the nozzle. The reductant supply conduit may include a third valve disposed between the pump and the reductant source. The third valve may be movable between open and closed positions to control a flow of reductant between the reductant source and the pump.

In another form, the present disclosure provides a method of operating an exhaust treatment system. The method may include operating a pump in a first direction to pump reductant from a reductant source to a nozzle. The pump may be operated in a second direction opposite the first direction to pump reductant toward the reductant source. The pump may be operated in the first direction to pump water from a water source to the nozzle.

In some embodiments, the method may include shutting down the pump and forcing compressed air through the pump in the second direction.

In some embodiments, the method may include providing compressed air to the nozzle simultaneously with operating the pump in the first direction to pump reductant from the reductant source to the nozzle.

In some embodiments, a valve may be closed to restrict communication between the reductant source and the pump while operating the pump in the first direction to pump water from the water source to the nozzle.

In some embodiments, the method may include operating the pump in the second direction to pump water toward the water source.

In another form, the present disclosure provides a method of operating an exhaust treatment system. The method may include pumping reductant through a conduit in a first direction from a reductant source to a nozzle and simultaneously supplying compressed air to the nozzle. One or more of reductant, air and water may be forced through the conduit in a second direction toward the reductant source. A flow of water may be provided through the conduit in the first direction.

In some embodiments, the method may include providing water to the nozzle simultaneously with supplying compressed air to the nozzle and simultaneously with pumping reductant through the conduit in the first direction from the reductant source to the nozzle.

In some embodiments, forcing one or more of reductant, air and water through the conduit in the second direction toward the reductant source includes forcing reductant through the conduit in the second direction toward the reductant source.

In some embodiments, the method may include forcing air through the conduit in the second direction.

In some embodiments, the method may include forcing water through the conduit in the second direction.

In some embodiments, water may be injected into an exhaust stream upstream of the nozzle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
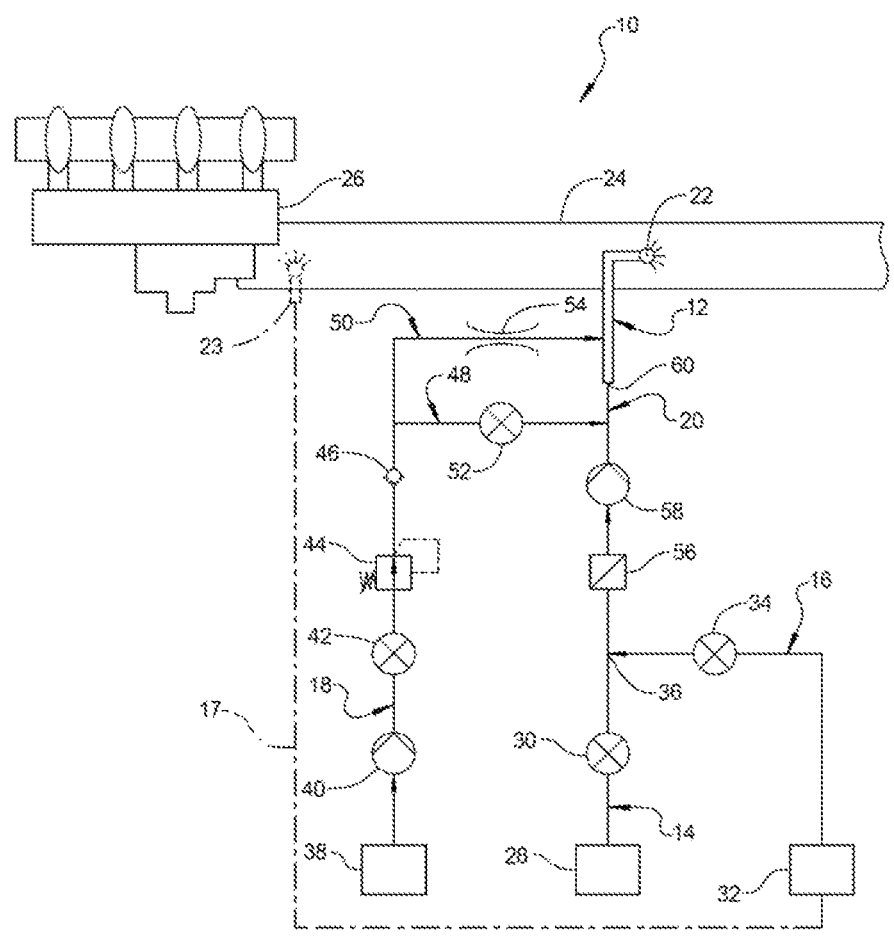
FIG. 1 is a schematic representation of an engine and exhaust treatment system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

With reference to FIG. 1, a reductant delivery system 10 is provided that may include an injector 12 in fluid communication with a reductant supply conduit 14, a water supply conduit 16, an air supply conduit 18, and a fluid delivery conduit 20. The injector 12 may include a nozzle 22 configured to spray air, reductant (e.g., urea) and/or water into a stream of exhaust gas flowing through an exhaust pipe 24 connected to a combustion engine 26. As will be described in more detail below, air and/or water may be used to purge and/or clean the reductant delivery system 10. The reductant delivery system 10 and engine 26 may be incorporated into a vehicle (e.g., an automotive land vehicle, a marine vehicle, an aircraft or a locomotive) or any other system or machinery.

The reductant supply conduit 14 may be in fluid communication with a reductant source 28 (e.g., a reductant tank) and may include a first valve 30. The water supply conduit 16 may be in fluid communication with a water source 32 and may include a second valve 34. In marine applications (i.e., in embodiments where the combustion engine 26 and reductant delivery system 10 are installed in a boat, ship or other marine vessel), the water source could be a ballast tank, a bilge and/or bilge pump, or a body of water in which the vessel is afloat, for example. In some embodiments, the water source 32 could be a water storage tank dedicated to the reductant delivery system 10. The water supply conduit 16 may form a three-way intersection 36 with the reductant supply conduit 14 and the fluid delivery conduit 20.

The air supply conduit 18 may include an air source 38 (e.g., the ambient environment or an air tank), an air compressor or pump 40, a third valve 42, a pressure-reducing valve 44, and a check valve 46. The air compressor 40 may be disposed between the air source 38 and the third valve 42. The pressure-reducing valve 44 may be disposed between the third valve 42 and the check valve 46 and may reduce the pressure of air flowing therethrough to a level that is appropriate for use in the reductant delivery system 10. The check valve 46 may be in communication with first and second parallel airflow paths 48, 50. The check valve 46 may allow airflow therethrough in a first direction (i.e., from the third valve 42 to the first and second airflow paths 48, 50) and restrict or prevent airflow therethrough in a second direction (i.e., from the first and second airflow paths 48, 50 to the third valve 42). The first airflow path 48 may include a fourth valve 52 and may fluidly couple the air supply conduit 18 with the fluid delivery conduit 20. The second airflow path 50 may include a restrictor 54 and may fluidly couple the air supply conduit 18 with the injector 12.

The fluid delivery conduit 20 may include a filter 56 and a pump 58. The filter 56 may be disposed between the three-way intersection 36 and the pump 58. The first airflow path 48 may be connected to the fluid delivery conduit 20 at a location between an inlet 60 of the injector 12 and the pump 58.

Operation of the pump 58, the first, second, third and fourth valves 30, 34, 42, 52 and/or the air compressor 40 may be controlled by a control module (not shown). The first, second, third and fourth valves 30, 34, 42, 52 may be solenoid valves, for example, or any other suitable electromechanical valve. The pump 58 may be operable in a first mode to pump fluid in a first direction (e.g., from the supply conduits 14, 16 toward the inlet 60 of the injector 12) and in a second mode to pump fluid in an opposite direction (e.g., from the inlet 60 of the injector 12 toward the supply conduits 14, 16). In some embodiments, the air compressor 40 may be controlled separately and independently from the reductant delivery system 10. In some embodiments, the air compressor 40 and air source 38 may be used for various other systems onboard the vehicle in which the reductant delivery system 10 is installed.

Figure 2:
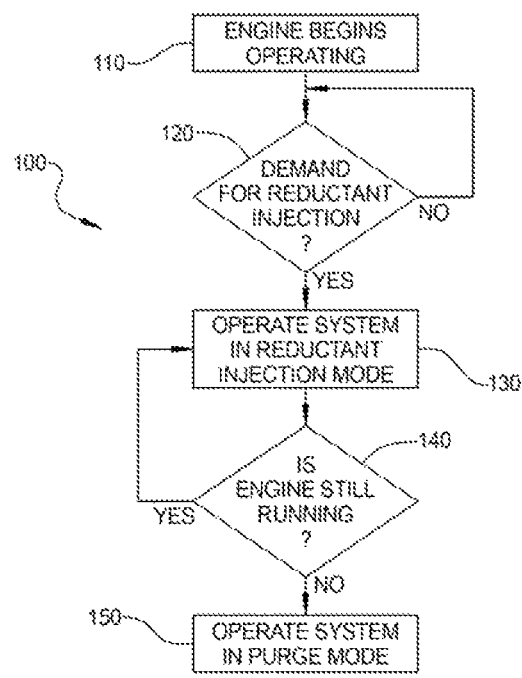
FIG. 2 is a flow chart illustrating operation of the exhaust treatment system according to the principles of the present disclosure.

With continued reference to FIGS. 1-3, operation of the reductant delivery system 10 will be described in detail. As described above, the reductant delivery system 10 may be operable in a reductant injection mode and a purge mode. In the reductant injection mode, the injector 12 may inject air, reductant and/or water into the stream of exhaust gas in the exhaust pipe 24. In the purge mode, air from the air source 38 and/or water from the water source 32 may be used to purge and/or clean the reductant delivery system 10. In some embodiments, the air compressor 40 may provide a constant supply of compressed air upstream of the third valve 42 during the reductant injection mode and during the purge mode.

A method 100 (FIG. 2) of operating the reductant delivery system 10 may begin at step 110 when operation of the engine 26 begins. Upon ignition of the engine 26, the control module may determine at step 120 whether there is a demand for reductant to be injected into the exhaust stream. This determination may be made based on engine operating parameters, for example. If the control module determines that there is a demand for reductant injection, the control module may cause the reductant delivery system 10 to operate in the reductant injection mode at step 130.

In the reductant injection mode, air from the air source 38 and reductant from the reductant source 28 may be injected into the exhaust stream through the nozzle 22. That is, the first valve 30 and the third valve 42 may be in open positions and the pumps 40, 58 may pump the air and reductant from the reductant and air sources 28, 38 through the injector 12. In some embodiments, the second valve 34 may be closed during the reductant injection mode to restrict or prevent water from being pumped through the injector 12. In some embodiments, the fourth valve 52 may be closed during the reductant injection mode, thereby forcing the air from the air supply conduit 18 into the injector 12 (or into a mixing chamber upstream of the injector 12) through the second airflow path 50 and restricting or preventing airflow through the first airflow path 48. The injector 12 may atomize the reductant and inject the mixture of air and reductant into the stream of exhaust gas.

In some embodiments, before and/or after step 130 in which the system 10 operates in the reductant injection mode, the control module may operate the system 10 in a water injection mode in which the second valve 34 may be opened, the first, third and fourth valves 30, 42, 52 may be dosed and the pump 58 may operate in the first direction to pump water through the water supply conduit 16, through the fluid delivery conduit 20 and through the injector 12 and nozzle 22. The nozzle 22 may spray the water into the exhaust stream. Operating the system 10 in the water injection mode can aid in decomposition of reductant deposits that may form throughout the system 10, in the exhaust pipe 24 and/or on exhaust aftertreatment devices (e.g., a diesel particulate filter (DPF) and/or a diesel oxidation catalyst (DOC)).

In some embodiments, water from the water source 32 may be injected into the exhaust stream through a water-injection line 17 and water-injection nozzle 23 (both shown in FIG. 1 in phantom lines) disposed upstream from the nozzle 22 before, during and/or after operation of the system 10 in the reductant injection mode. Injecting water into the exhaust stream upstream of the nozzle 22 increases water vapor concentration in the exhaust steam, which may reduce or prevent formation of urea deposits (e.g., biurets and triurets) at and/or downstream of the nozzle 22. In some embodiments, one or more components disposed downstream of the nozzle 22 (e.g., a mixer and/or a suspension plate) may include a hydrolysis catalyst coating that may further aid in reducing formation of urea deposits.

At step 140, the control module may determine whether the engine 26 is still running. If the engine 26 is still running, the control module may continue to operate the reductant delivery system 10 in the reductant delivery mode. Upon shutdown of the engine 26, the control module may operate the reductant delivery system 10 in the purge mode at step 150. In the purge mode, the injector 12 and the conduits 14, 20 (including the first valve 30, filter 56 and/or pump 58 disposed along conduits 14, 20) may be purged and/or cleaned to prevent deposits from building up on various system components and to prevent reductant and/or water from freezing within the injector 12, the conduits 14, 20, first valve 30, filter 56 and/or pump 58. In some embodiments, the control module may periodically operate the system 10 in the purge mode while the engine 26 is running.

Figure 3:
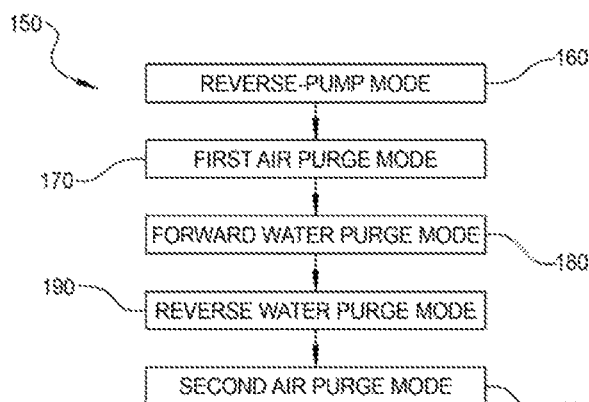
FIG. 3 is a flow chart illustrating operation of the exhaust treatment system in a purge mode according to the principles of the present disclosure.

With reference to FIG. 3, method steps for operating the reductant delivery system 10 in the purge mode will be described in detail. The purge mode may begin at step 160, where the system 10 may be operated in a reverse-pump mode. In the reverse-pump mode, the first valve 30 may be open, the second, third and fourth valves 34, 42, 52 may be closed, and the pump 58 may operate in the second (reverse) pumping direction to pump fluid in a direction from injector 12 toward the reductant source 28. In this manner, the reductant in the injector 12, the fluid delivery conduit 20 and the reductant supply conduit 14 may be pumped back into to the reductant source 28.

Next, at step 170, the control module may cause the system 10 to operate in a first air purge mode. In the first air purge mode, the second valve 34 may remain in the closed position, the first valve 30 may remain in the open position, the third and fourth valves 42, 52 may be opened, and the pump 58 may be shut down. With the first, third and fourth valves 30, 42, 52 open and the second valve 34 closed, the compressed air from the air supply conduit 18 may flow through the first airflow path 48 to the fluid delivery conduit 20. The air may continue to flow through the fluid delivery conduit 20, through the pump 58 and filter 56 and through the reductant supply conduit 14. In this manner, the air may purge liquid from the fluid delivery conduit 20, pump 58, filter 56 and reductant supply conduit 14.

Next, at step 180, the control module may cause the system 10 to operate in a forward water purge mode. In the forward water purge mode, the second valve 34 may be opened, the first, third and fourth valves 30, 42, 52 may be closed, and the pump 58 may be operated in the first pumping direction to pump water from the water source 32 through the filter 56, pump 58, injector 12 and nozzle 22. Pumping water through the filter 56, pump 58, injector 12 and nozzle 22 may dissolve deposits in the filter 56, pump 58, injector 12 and nozzle 22 that may have formed due to reductant flowing therethrough.

Next, at step 190, the control module may cause the system 10 to operate in a reverse water purge mode. In the reverse water purge mode, the second valve 34 remain opened and the first, third and fourth valves 30, 42, 52 may remain closed, and the pump 58 may be operated in the second pumping direction to pump water from the injector 12, fluid delivery conduit 20, pump 58 and filter 56 back to the water source 32 (or to a location between the second valve 34 and the water source 32).

Finally, at step 200, the control module may cause the system 10 to operate in a second air purge mode. In the second air purge mode, the first valve 30 may remain closed, the second, third and fourth valves 34, 42, 52 may be opened, and the pump 58 may be shut down. In this mode, compressed air from the air supply conduit 18 may flow through the first airflow path 48 to the fluid delivery conduit 20. The air may continue to flow through the fluid delivery conduit 20, through the pump 58, filter 56 and through the water supply conduit 16. In this manner, the air may purge liquid from the fluid delivery conduit 20, pump 58, filter 56 and water supply conduit 16.

In this application, the term "module" may be replaced with the term "circuit." The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust treatment system comprising:
    a gas supply conduit in fluid communication with a source of compressed gas and including a first valve controlling a flow of compressed gas through the gas supply conduit;
    a reductant supply conduit in fluid communication with a reductant source;
    a water supply conduit in fluid communication with a water source and including a second valve controlling a flow of water through the water supply conduit;
    a nozzle in fluid communication with the gas supply conduit, the reductant supply conduit and the water supply conduit; and
    a pump disposed between the nozzle and the second valve and in fluid communication with the reductant supply conduit and the water supply conduit, the pump being operable in a first pumping direction to pump reductant from the reductant source to the nozzle and in a second pumping direction to pump reductant away from the nozzle and toward the reductant source, wherein the pump is operable in the first pumping direction to pump water from the water source to the nozzle and the PUMP is operable in the second pumping direction to pump water away from the nozzle and toward the water source.

2. The exhaust treatment system of claim 1, wherein the reductant supply conduit includes a third valve movable between open and closed positions to control a flow of reductant between the reductant source and the pump.

3. The exhaust treatment system of claim 1, further comprising a filter disposed between the pump and the second valve and in fluid communication with the reductant supply conduit and the water supply conduit.

4. The exhaust treatment system of claim 1, wherein the source of compressed gas includes a source of compressed air.

5. The exhaust treatment system of claim 1, wherein the gas supply conduit is in fluid communication with parallel first and second gas flow paths.

6. The exhaust treatment system of claim 5, wherein the first gas flow path includes a third valve that is movable between a first position allowing gas flow through the first gas flow path and a second position restricting gas flow through the first gas flow path.

7. The exhaust treatment system of claim 6, wherein the first gas flow path fluidly couples the gas supply conduit with a conduit extending between the pump and a first inlet of the nozzle.

8. The exhaust treatment system of claim 7, wherein the second gas flow path bypasses the third valve and couples the gas supply conduit with a second inlet of the nozzle disposed between the first inlet and an outlet of the nozzle.

9. The exhaust treatment system of claim 8, wherein the second gas flow path includes a restrictor.

10. The exhaust treatment system of claim 8, wherein the reductant supply conduit includes a fourth valve movable between open and closed positions to control a flow of reductant between the reductant source and the pump.

11. The exhaust treatment system of claim 10, comprising:
the exhaust treatment system being operable in a first purge mode in which the pump is operating in the second pumping direction, the fourth valve is open and the first, second and third valves are closed;
the exhaust treatment system being operable in a second purge mode in which the pump stops operating, the second valve is closed and the first, third and fourth valves are open;
the exhaust treatment system being operable in a third purge mode in which the pump is operating in the first pumping direction, the second valve is open and the first, third and fourth valves are closed;
the exhaust treatment system being operable in a fourth purge mode in which the pump is operating in the second pumping direction, the second valve is open and the first, third and fourth valves are closed; and
the exhaust treatment system being operable in a fifth purge mode in which the fourth valve is closed and the first, second and third valves are open.

12. The exhaust treatment system of claim 11, wherein the second purge mode is performed after the first purge mode; the third purge mode is performed after the second purge mode; the fourth purge mode is performed after the third purge mode; and the fifth purge mode is performed after the fourth purge mode.

13. An exhaust treatment system comprising:
a gas supply conduit in fluid communication with a source of compressed gas and including a first valve controlling a flow of compressed gas through the gas supply conduit;
a reductant supply conduit in fluid communication with a reductant source;
a water supply conduit in fluid communication with a water source and including a second valve controlling a flow of water through the water supply conduit;
a nozzle in fluid communication with the gas supply conduit, the reductant supply conduit and the water supply conduit;
a pump disposed between the nozzle and the second valve and in fluid communication with the reductant supply conduit and the water supply conduit;
a filter disposed between the pump and the second valve and in fluid communication with the reductant supply conduit and the water supply conduit; and
first and second gas flow paths extending between and in fluid communication with the gas supply conduit and the nozzle,
wherein the reductant supply conduit includes a third valve disposed between the pump and the reductant source, the third valve being movable between open and closed positions to control a flow of reductant between the reductant source and the pump.

14. The exhaust treatment system of claim 13, wherein the first gas flow path includes a fourth valve that is movable between a first position allowing gas flow through the first gas flow path and a second position restricting gas flow through the first gas flow path.

15. The exhaust treatment system of claim 14, wherein the second gas flow path includes a restrictor.

16. The exhaust treatment system of claim 14, wherein the first gas flow path fluidly couples the gas supply conduit with a conduit extending between the pump and a first inlet of the nozzle.

17. The exhaust treatment system of claim 16, wherein the second gas flow path bypasses the fourth valve and couples the gas supply conduit with a second inlet of the nozzle disposed between the first inlet and an outlet of the nozzle.

18. The exhaust treatment system of claim 13, wherein the pump is operable in a first pumping direction to pump reductant from the reductant source to the nozzle and in a second pumping direction to pump reductant away from the nozzle and toward the reductant source.

19. The exhaust treatment system of claim 18, wherein the pump is operable in the first pumping direction to pump water from the water source to the nozzle.

20. The exhaust treatment system of claim 19, wherein the pump is operable in the second pumping direction to pump water away from the nozzle and toward the water source.

21. The exhaust treatment system of claim 13, wherein the source of compressed gas includes a source of compressed air.

22. A method of operating an exhaust treatment system, the method comprising:
operating a pump in a first direction to pump reductant from a reductant source to a nozzle;
operating the pump in a second direction opposite the first direction to pump reductant toward the reductant source;
operating the pump in the first direction to pump water from a water source to the nozzle; and
shutting down the pump and forcing compressed air through the pump in the second direction.

23. The method of claim 22, further comprising providing compressed air to the nozzle simultaneously with operating the pump in the first direction to pump reductant from the reductant source to the nozzle.

24. The method of claim 22, wherein a valve is closed to restrict communication between the reductant source and the pump while operating the pump in the first direction to pump water from the water source to the nozzle.

25. The method of claim 24, further comprising operating the pump in the second direction to pump water toward the water source.

26. A method of operating an exhaust treatment system, the method comprising:
pumping reductant through a conduit in a first direction from a reductant source to a nozzle and simultaneously supplying compressed air to the nozzle;

forcing one or more of reductant, air and water through the conduit in a second direction toward the reductant source; and providing a flow of water through the conduit in the first direction, wherein forcing one or more of reductant, air and water through the conduit in the second direction toward the reductant source includes forcing reductant through the conduit in the second direction toward the reductant source and forcing air through the conduit in the second direction.

27. The method of claim 26, further comprising providing water to the nozzle simultaneously with supplying compressed air to the nozzle and simultaneously with pumping reductant through the conduit in the first direction from the reductant source to the nozzle.

28. The method of claim 26, further comprising forcing water through the conduit in the second direction.

29. A method of operating an exhaust treatment system, the method comprising:

pumping reductant through a conduit in a first direction from a reductant source to a nozzle and simultaneously supplying compressed air to the nozzle;

forcing one or more of reductant, air and water through the conduit in a second direction toward the reductant source;

providing a flow of water through the conduit in the first direction; and injecting water into an exhaust stream upstream of the nozzle.

* * * * *

UNITED STATES PATENT AND TRADEMARK OFFICE
CERTIFICATE OF CORRECTION

PATENT NO. : 9,334,775 B2
APPLICATION NO. : 14/389224
DATED : May 10, 2016
INVENTOR(S) : Wu et al.

Page 1 of 1

It is certified that error appears in the above-identified patent and that said Letters Patent is hereby corrected as shown below:

In the specification

Col. 6, line 48:    Delete "dosed" and insert --closed--

In the claims

Col. 8, line 57:    Delete "PUMP" and insert --pump--

Signed and Sealed this
Twelfth Day of July, 2016

Michelle K. Lee
*Director of the United States Patent and Trademark Office*